United States Patent [19]

Golder

[11] Patent Number: 4,929,656

[45] Date of Patent: May 29, 1990

[54] BLENDS COPOLYESTER ELASTOMERS AND CHLORINATED POLYETHYLENE

[75] Inventor: Michael D. Golder, Allendale, N.J.

[73] Assignee: Hoechst Celanese Corporation, Summit, N.J.

[21] Appl. No.: 350,212

[22] Filed: May 11, 1989

[51] Int. Cl.$^5$ .................. C08L 67/02; C08L 71/02
[52] U.S. Cl. .................. 524/195; 524/206; 524/209; 525/173; 525/177
[58] Field of Search .............. 525/173, 177; 524/195, 524/206, 209

[56] References Cited

U.S. PATENT DOCUMENTS 3,718,715 2/1973 Crawford .................. 525/173

Primary Examiner—Patricia Short
Attorney, Agent, or Firm—Herbert P. Price

[57] ABSTRACT

Elastomeric compositions having resistance to hot grease aging are made from a blend of a thermoplastic copolyester elastomer, and chorinated polyethylene with or without the addition of a carbodiimide and a guanidine.

15 Claims, No Drawings

BLENDS COPOLYESTER ELASTOMERS AND CHLORINATED POLYETHYLENE

BACKGROUND OF INVENTION

The field of art to which this invention is directed is modified thermoplastic copolyester elastomers.

Segmented thermoplastic copolyester elastomers, which contain recurring polymeric long chain ester units derived from phthalic acids and long chain glycols and short chain ester units derived from phthalic acids and short chain glycols, are described in such patents as U.S. Pat. Nos. 3,651,014, 3,763,109 and 4,355,155.

Blends of segmented thermoplastic copolyester elastomers and polyvinyl chloride are described in U.S. Pat. No. 3,718,715.

In U.S. Pat. No. 3,835,098, a process is described for improving the thermal and hydrolytic stability of copolyester elastomers by reacting the elastomer with substantially linear polycarbodiimides having an average of at least two carbodiimide groups per molecule.

Blends of copolyester elastomers, ethylene/carboxylic acid copolymers and polycarbodiimides are described in U.S. Pat. No. 3,963,801.

The thermal-stabilization of copolyester elastomers with guanidines, such as 1,6-hexamethylene-dicyandiamide, is described in U.S. Pat. Nos. 4,520,148, 4,520,149 and 4,520,150.

In many applications, e.g., constant velocity boots used in front-wheel drive automobiles, there is a need for elastomeric compositions which can stand extended contact with hot grease without losing strength and elastomeric properties.

SUMMARY OF INVENTION

This invention is directed to thermoplastic copolyester elastomeric compositions having improved resistance to hot grease. In one aspect, this invention relates to thermoplastic copolyester elastomers blended with chlorinated polyethylene. In another aspect, this invention pertains to copolyester elastomer-chlorinated polyethylene blends further modified with carbodiimides and guanidines.

The compositions of this invention are made from a blend of (A) about 60 to about 95 weight percent thermoplastic copolyester elastomer and (B) about 5 to about 40 weight percent chlorinated polyethylene wherein said weight percentages are based on the total weight of (A) and (B). The compositions of this invention also include blends of thermoplastic copolyester elastomers and chlorinated polyethylene further modified with about 0.5 to about 5 weight percent carbodiimide and about 0.1 to about 2 weight percent guanidine, said weight percentages being based on the total weight of the composition.

The thermoplastic copolyester elastomer, which is also referred to as a segmented copolyester elastomer, is comprised of a multiplicity of recurring long chain ester units and short chain ester units joined head to tail through ester linkages. The long chain ester units are represented by at least one of the following structures:

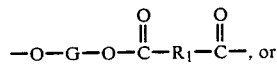  (a)

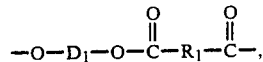  (b)

and the short chain ester units are represented by at least one of the following structures:

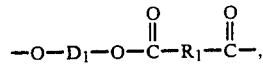  (c)

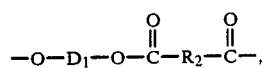  (d)

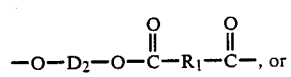  (e)

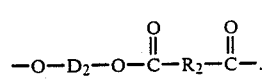  (f)

In the formulas, G is a divalent radical remaining after the removal of the terminal hydroxyl groups from a long chain polymeric glycol having a molecular weight above about 400 and a melting point below about 55° C.;

$R_1$ and $R_2$ are different divalent hydrocarbon radicals remaining after removal of carboxyl groups from different dicarboxylic acids, each having a molecular weight less than about 300; and $D_1$ and $D_2$ are different divalent radicals remaining after removal of hydroxyl groups from different low molecular weight diols having molecular weights less than about 250. The short chain ester units in the thermoplastic copolyester provide about 25 to about 95 percent of the weight of said copolyester. About 50 to about 100 percent of the short chain ester units in the copolyester are identical.

The chlorinated polyethylenes are made from high density polyethylene chlorinated with about 25 to about 45 weight percent chlorine.

The carbodiimides contain only one carbodiimide group per molecule and are represented by the formula:

$$R^1N=C=NR^2$$

wherein $R^1$ and $R^2$ are alkyl, cycloalkyl, or aryl groups.

DESCRIPTION OF INVENTION

Thermoplastic copolyester elastomers useful in this invention are described in detail in U.S. Pat. Nos. 3,651,014 and 4,355,155, which are hereby incorporated by reference.

The term "long chain ester units," as applied to units in the polymer chain of the thermoplastic copolyester elastomers refers to the reaction product of a long chain glycol with a dicarboxylic acid. Such "long chain ester units" correspond to the structures identified as (a) and (b) hereinabove. The long chain glycols are polymeric glycols having terminal (or as nearly terminal as possible) hydroxy groups and a molecular weight above about 400 and, preferably, from about 600 to about 6,000. The long chain glycols used to prepare the copolyesters are generally poly(oxyalkylene) glycols or glycol esters of poly(oxyalkylene) glycols and dicarboxylic acids.

The term "short chain ester units," as applied to units in the polymer chain, refers to low molecular weight compounds or polymer chain units having molecular weights less than about 550. They are made by reacting a low molecular weight diol (molecular weight below about 250) with a dicarboxylic acid to form repeating units corresponding to the structures identified as (c), (d), (e) and (f) hereinabove.

The term "dicarboxylic acid" as used herein is intended to include the condensation polymerization equivalents of dicarboxylic acids, i.e., their esters or ester forming derivatives, such as acid chlorides, anhydrides, or other derivatives which behave substantially like dicarboxylic acids in a polymerization reaction with a glycol.

The copolyesters used in this invention are prepared by polymerizing with each other (a) one or more dicarboxylic acids or their equivalents, (b) one or more long-chain glycols, and (c) one or more low molecular weight diols. The polymerization reaction can be conducted by conventional procedures, as for example, in bulk or in a solvent medium which dissolves one or more of the monomers.

The dicarboxylic acids used in making the copolyesters have molecular weights less than about 300. They can be aromatic, aliphatic or cycloaliphatic. These dicarboxylic acids can contain any substituent groups which do not interfere with the polymerization reaction. Examples of useful dicarboxylic acids are orthophthalic acid, isophthalic acid, terephthalic acid, bibenzoic acid, bis(p-carboxyphenyl) methane, p-oxy(p-carboxylphenyl) benzoic acid, ethylene bis(p-oxybenzoic acid), 1,5-naphthalene dicarboxylic acid, 2,7-naphthalene dicarboxylic acid, phenanthralene dicarboxylic acid, 4,4'-sulfonyl dibenzoic acid, and the like, as well as $C_1$–$C_{10}$ alkyl and other ring substituted derivatives thereof, such as halo, alkoxy, or aryl derivatives. Hydroxy acids, such as p-(beta-hydroxyethyoxy) benzoic acid can also be used provided an aromatic dicarboxylic acid is also present.

Additional useful dicarboxylic acids are sebacic acid, 1,3-or 1,4-cyclohexane dicarboxylic acid, adipic acid, glutaric acid, succinic acid, oxalic acid, azelaic acid, fumaric acid, 4-cyclohexene-1,2-dicarboxylic acid, pimelic acid, suberic acid, 2,2,3,3-tetramethylsuccinic acid, and the like.

Preferred dicarboxylic acids are aromatic acids containing 8–16 carbon atoms, the cyclohexane-dicarboxylic acids and adipic acids. Particularly preferred dicarboxylic acids are terephthalic acid and isophthalic acid, or mixtures thereof. Mixtures of terephthalic acid and isophthalic acid wherein about 1 to about 20 percent by weight of the mixture is isophthalic acid are used when products of lower flexural modulus are desired.

The long chain glycols used in making the copolyesters have molecular weights of about 400 to about 6000, a melting point less than about 55° C. and a carbon to oxygen ratio greater than about 2.0. Useful long chain glycols include those derived from 1,2-alkylene oxides wherein the alkylene group contains 2 to about 10 carbon atoms, examples of which are ethylene oxide, 1,2-propylene oxide, 1,2-butylene oxide and 1,2-hexylene oxide. Other useful long chain glycols are random or block copolymers of ethylene oxide and 1,2-propylene oxide. Preferred long chain glycols are poly(oxytetramethylene) glycols which are derived from tetrahydrofuran. A particularly preferred long chain glycol is poly(oxytetramethylene) glycol which has an average molecular weight of about 1000.

Useful low molecular weight diols which react to form short chain ester units of the copolyester include such diols as ethylene glycol, propylene glycol, 1,4-butanediol, 1,4-butenediol, 1,6-hexamethylene glycol, dihydroxycyclohexane, cyclohexane dimethanol, resorcinol, hydroquinone, 1,5-dihydroxy naphthalene, bisphenol A and the like. Equivalent ester forming derivatives of diols, e.g., ethylene oxide or propylene carbonate, are also useful. Preferred diols are 1,4-butanediol and 1,4-butenediol, or mixtures of the two. Such a preferred mixture is one wherein about 10 to about 40 weight percent, most preferably about 20 to about 30 weight percent, of the mixture is 1,4-butenediol.

In producing the polyesters of this invention, a single long chain glycol or a mixture of glycols can be used. In the latter case, there will be more than one G unit in the polymer chain and the number of different long chain units will be proportionately increased. In any event, the long chain glycols react with at least one low molecular weight diol and at least one dicarboxylic acid to form a thermoplastic polyester in which long and short chain ester units are connected head-to-tail through ester linkages.

In place of a single low molecular weight diol, a mixture of such diols can be used; in place of a single long chain glycol, a mixture of such compounds can be used, and in place of a single low molecular weight dicarboxylic acid, a mixture of two or more can be used. Thus, the letter G in the structures shown hereinabove can represent the residue of a single long chain glycol or the residue of several different glycols, the letters $D_1$ and $D_2$ can represent the residues of one or several low molecular weight diols, and the letters $R_1$ and $R_2$ can represent the residues of one or several dicarboxylic acids.

Short chain ester units must contribute about 25 to about 95 weight percent of the copolyester, preferably about 45 to about 65 percent, and it is important that about 50 to about 100 percent of the total short chain ester units be identical, that is be the reaction product of a single low molecular weight diol and a single low molecular weight dicarboxylic acid. These units will normally be distributed statistically throughout the polymer backbone.

The copolyesters are prepared from the components under well known condensation polymerization conditions at temperatures of about 150° to about 260° C., preferably about 225 to about 260° C.

The chlorinated polyethylene useful in this invention is chlorinated high density polyethylene having a chlorine content of about 25 to about 45 weight percent and melt viscosities of about 10,000 to about 30,000 poises. Particularly preferred chlorinated polyethylenes contain about 35 to about 45 weight percent chlorine. Chlorinated polyethylenes are well known compositions which are described in detail in "Encyclopedia of Polymer Science and Technology" Volume 6, page 432–442, Interscience Publishers (1967) which is hereby incorporated by reference.

The compositions of this invention contain about 60 to about 95 weight percent thermoplastic copolyester elastomer and about 5 to about 40 weight percent chlorinated polyethylene. Preferred amounts are about 65 to about 90 weight percent thermoplastic copolyester elastomer and about 10 to about 35 weight percent chlorinated polyethylene. The weight percentages are based on the total weight of the two components. The blends of this invention have improved stability as shown by their resistance to hot grease.

Greater improvements in hot grease resistance of the blends are obtained when carbodiimides and guanidines are included.

The carbodiimides useful in this invention are monomeric having only one carbodiimide group per molecule, and are represented by the formula:

$$R^1N=C=NR^2$$

wherein $R^1$ and $R^2$ are alkyl groups containing from 1 to about 18 carbon atoms, cycloalkyl groups containing 5 to about 10 carbon atoms, or aryl groups, which term includes alkaryl and arylalkyl groups, containing 6 to about 18 carbon atoms. Examples of such carbodiimides are dimethyl carbodiimide, diisopropyl carbodiimide, diisobutyl carbodiimide, dioctyl carbodiimide, tert-butyl isopropyl carbodiimide, dodecyl isopropyl carbodiimide, dicyclohexyl carbodiimide, diphenyl carbodiimide, di-o-tolyl carbodiimide, bis(2,6-diethylphenyl) carbodiimide, bis(2,6-diisopropylphenyl) carbodiimide, di-B-naphthyl carbodiimide, benzyl isopropyl carbodiimide, and the like. Preferred carbodiimides are those wherein the R groups are aromatic. A particularly preferred carbodiimide is bis(2,6-diisopropylphenyl) carbodiimide. Carbodiimides are described in detail in "The Chemistry of Carbodiimides" by H. G. Khorana - Chemical Reviews Vol 3, pages 145–166 (1953), which is hereby incorporated by reference.

Guanidines useful in this invention are represented by the formula

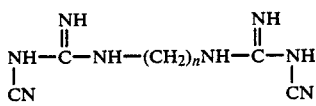

wherein n is an iteger of about 2 to about 20. A particularly preferred guanidine is one wherein n in the formula is 6, i.e., 1,6-hexamethylene-bis-dicyandiamide.

The carbodiimide and the guanidines are used in combination with the thermoplastic copolyester elastomer and the chlorinated polyethylene in the amounts of about 0.5 to about 5 weight percent carbodiimide, and preferably about 1 to about 3 weight percent, and about 0.1 to about 2 weight percent guanidine, preferably about 0.3 to about 1 weight percent, said weight percentages being based on the total weight of the 4 components in the composition.

As shown in my copending applications, Ser. No. 238,300, filed Aug. 30, 1988, and Ser. No. 238,464 filed Aug. 30, 1988, the blending of carbodiimides with thermoplastic copolyester elastomers improves the resistance of the copolyester elastomer to hot grease. When a guanidine is added to a thermoplastic copolyester elastomer, little or no improvement in hot grease resistance is noted. However, the advantage of incorporating a guanidine in the copolyester elastomer, chlorinated polyethylene, carbodiimide blends is better control of melt flow rates. Chlorinated polyethylene acts as a plasticizer for the polyester elastomer, resulting in an increased melt flow rate for the combination. The addition of a guanidine to the blend results in a composition having the same or a slightly lower melt flow rate than the polyester elastomer alone.

In preparing the compositions of the invention, the components are tumble blended, followed by melt compounding on single screw or twin screw extruders. The blends are then extruded in sheet form.

The following examples will describe the invention in more detail. Parts and percentages unless otherwise designated are parts and percentages by weight.

EXAMPLE A

The compositional data and the physical properties of the copolyester elastomers used in the examples are shown in Table A.

TABLE A

| COPOLYESTER | A | B |
|---|---|---|
| Shore D Hardness | 55 | 47 |
| Wt % Hard Segment | 62 | 53 |
| Wt % Soft Segment | 38 | 47 |
| Melting Point °C. of Copolyester | 184 | 178 |
| Melt Index (220° C. and 2160 cm) | 6.0 | 11.5 |
| Inherent Viscosity | 1.35 | 1.0 |

All of the copolyesters contain terephthalic acid and both 1,4-butenediol (BD) and 1,4-butenediol (BD) in the hard segments in a mole ratio of BD/(BD+BD)=0.25.

EXAMPLE B

The chlorinated polyethylenes used in the examples are DOW CPE Resins 3615 and 4211. These resins, designated as CPE 1 and CPE 2 respectively, have the following properties.

| CPE | 1 | 2 |
|---|---|---|
| Chlorine content % | 36 | 42 |
| Melt viscosity poises | 26,500 | 9,000 |
| Bulk density, lb/ft | 27 | 35 |
| Residual crystallinity % | 2 | 2 |

EXAMPLE 1

Copolyester Elastomer A described in Example A was tumble blended with chlorinated polyethylene CPE1. The blend was melt compounded in a one inch single screw extruder at 420° F. and at 80 RPM and was extruded in sheet form. Resistance to hot grease aging was determined on ASTM D412 tensile bars stamped from the extruded sheet. The tensile bars were placed in jars filled with grease used in the front-wheel drive systems of automobiles and were placed in ovens heated at 100° C. for 4 weeks. The tensile strength at break (TS-BK) and the tensile elongation at break (Elong-Bk) were determined on the tensile bars before aging and after aging. The percent retention of these properties was then calculated. The amount of each component in the blend and the strength retention properties are shown in Table 1.

TABLE 1

| | EXAMPLE | | | |
|---|---|---|---|---|
| | 1a | 1b | 1c | 1d |
| Copolyester A % | 100 | 87.5 | 77 | 67 |
| CPE % | | 12.5 | 23 | 33 |
| RETENTION PROPERTIES | | | | |
| % Retention-TS-BK | 53 | 56 | 56 | 51 |
| % Retention-Elong-BK | 17 | 20 | 54 | 71 |

As can be seen from the data shown in Table 1, the strength retention properties after exposure to hot grease of the compositions of this invention are much improved over those of unmodified copolyester elastomer.

EXAMPLE 2

Blends were prepared from copolyester B, CPE2, bis(2,6-diisopropylphenyl) carbodiimide, and 1,6-hexamethylene-bis-dicyandimide (HMBD) using the procedure described in Example 1. The compositional data and aging results in 100° C. grease after 3 weeks and after 6 weeks, as well as the melt flow rate of the blends as determined by ASTM D1238 at 320° C. are shown in Table 2.

TABLE 1

| | EXAMPLE | | | |
|---|---|---|---|---|
| | 2a | 2b | 2c | 2d |
| Copolyester B % | 100 | 84.1 | 84.4 | 77.1 |
| CPE % | | 12.7 | 12.75 | 20 |
| Carbodiimide % | | 2.5 | 2.5 | 2.3 |
| HMBD % | | 0.7 | 0.35 | 0.6 |
| RETENTION PROPERTIES | | | | |
| 3 WEEKS | | | | |
| % Retention-TS-BK | 44 | 81 | 75 | 82 |
| % Retention-Elong-BK | 20 | 101 | 92 | 95 |
| 6 WEEKS | | | | |
| % Retention-TS-BK | 47 | 82 | 75 | 78 |
| % Retention-Elong-BK | 13.7 | 82 | 78 | 81 |
| Melt Flow Rate | 11.9 | 9.6 | 10.4 | 9.1 |

The addition of a carbodiimide and chlorinated polyethylene dramatically increases the resistance of the copolyester elastomer to hot grease.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may by those skilled in the art without departing from the spirit and scope of the invention.

What is claimed is:

1. An elastomeric composition comprising a blend of:
   (A) about 60 to about 95 weight percent thermoplastic copolyester elastomer; and
   (B) about 5 to about 40 weight percent of a chlorinated polyethylene, said weight percents being based on the total weight of (A) and (B), wherein (A), the segmented copolyester elastomer, is comprised of a multiplicity of recurring long chain ester units and short chain ester units joined head to tail through ester linkages, said long chain units being represented at least one of the structures:

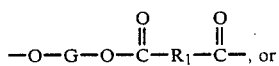 (a)

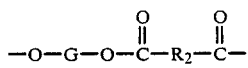 (b)

and the short chain ester units are represented by at least one of the following structures:

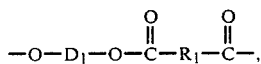 (c)

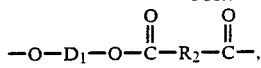 (d)

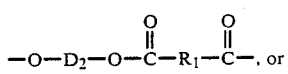 (e)

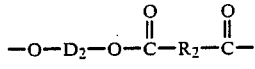 (f)

wherein G is a divalent radical remaining after the removal of the terminal hydroxyl groups from a long chain polymeric glycol having a molecular weight above about 400 and a melting point below about 55° C.;

wherein $R_1$ and $R_2$ are different divalent hydrocarbon radicals remaining after removal of carboxyl groups from different dicarboxylic acids, each having a molecular wright less than about 300; and wherein $D_1$ and $D_2$ are different divalent radicals remaining after removal of hydroxyl groups from different low molecular weight diols having molecular weights less than about 250, provided said short chain segments amount to between about 25 and about 95 percent by weight of the copolyester and wherein about 50 to about 100 percent of the short chain ester units are identical; and wherein (B) the chlorinated polyethylene, is derived from high density polyethylene chlorinated with about 25 to about 45 weight percent chlorine.

2. The composition of claim 1 wherein the aromatic dicarboxylic acid is terephthalic acid, isophthalic acid, or mixtures thereof, and wherein the aliphatic diol is 1,4-butanediol or 1,4-butenediol or mixtures thereof.

3. The composition of claim 2 wherein (A) is present in the amount of about 65 to about 90 weight percent, and (B) is present in the amount of about 10 to about 35 weight percent.

4. The composition of claim 1 wherein the polyether glycol is a polyoxyalkylene glycol wherein the alkylene groups contain two to four carbon atoms.

5. The composition of claim 4 wherein the polyether glycol is polyoxytetramethylene glycol having an average molecular weight of about 1000.

6. The composition of claim 1 wherein the short chain segments amount to between about 45 percent and about 65 percent by weight of the copolyester.

7. The composition of claim 2 wherein between about 10 percent and about 40 percent of the D groups represent divalent radicals remaining after removal of hydroxyl groups from 1,4-butenediol.

8. The composition of claim 2 wherein between about 20 percent and about 30 percent of the D groups represent divalent radicals remaining after removal of hydroxyl groups from 1,4-butenediol.

9. The composition of claim 2 wherein the R groups are hydrocarbon radicals remaining after the removal of carboxyl groups from terephthalic acid.

10. The composition of claim 2 wherein between about 1 to about 20 percent of R groups are hydrocarbon radicals remaining after removal of the carboxyl groups from isophthalic acid.

11. The composition of claim 1 which also contains 0.5 to about 5 weight percent carbodiimide and about 0.1 to about 2 weight percent guanidine wherein the carbodiimide is represented by the formula:

$$R^1N=C=NR^2$$

wherein $R^1$ and $R^2$ are alkyl groups, cycloalkyl groups, or aryl groups; and wherein the guanidine is represented by the formula

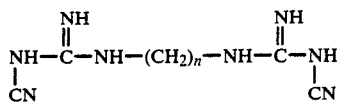

wherein n is an integer of 2 to 20.

12. The composition of claim 11 wherein the carbodiimide is present in the amount of about 1 to about 3 weight percent and the guanidine is present in the amount of about 0.3 to about 1 weight percent.

13. The composition of claim 11 wherein the $R^1$ and $R^2$ substituents on the carbodiimide are aromatic groups.

14. The composition of claim 13 wherein the carbodiimide is bis(2,6-diisopropylphenyl) carbodiimide.

15. The composition of claim 11 wherein the guanidine is 1,6-hexamethylene-bis-dicyandiamide.

* * * * *